Sept. 14, 1954  E. H. LAND  2,689,306
DEVICE FOR HOLDING SELF-DEVELOPING PHOTOGRAPHIC
FILM AND APPARATUS FOR PROCESSING SAID FILM
Filed March 6, 1951  5 Sheets-Sheet 1

INVENTOR
Edwin H. Land
BY
Brown and Mikulka
and
Moncure B. Berg
ATTORNEYS

Sept. 14, 1954 E. H. LAND 2,689,306
DEVICE FOR HOLDING SELF-DEVELOPING PHOTOGRAPHIC
FILM AND APPARATUS FOR PROCESSING SAID FILM
Filed March 6, 1951 5 Sheets-Sheet 2

INVENTOR
Edwin H. Land
BY
Brown and Mikulka
and
Moncure B. Berg
ATTORNEYS

Sept. 14, 1954 E. H. LAND 2,689,306
DEVICE FOR HOLDING SELF-DEVELOPING PHOTOGRAPHIC
FILM AND APPARATUS FOR PROCESSING SAID FILM
Filed March 6, 1951 5 Sheets-Sheet 3

INVENTOR
Edwin H. Land
BY
Brown and Mikulka
and
Moncure B. Berg
ATTORNEYS

Sept. 14, 1954 E. H. LAND 2,689,306
DEVICE FOR HOLDING SELF-DEVELOPING PHOTOGRAPHIC
FILM AND APPARATUS FOR PROCESSING SAID FILM
Filed March 6, 1951 5 Sheets-Sheet 4

INVENTOR
Edwin H. Land
BY Brown and Mikulka
and
Moncure B. Berg
ATTORNEYS

Sept. 14, 1954 E. H. LAND 2,689,306
DEVICE FOR HOLDING SELF-DEVELOPING PHOTOGRAPHIC
FILM AND APPARATUS FOR PROCESSING SAID FILM
Filed March 6, 1951 5 Sheets-Sheet 5

INVENTOR
Edwin H. Land
BY
Brown and Mikulka
and
Moncure B. Berg
ATTORNEYS

Patented Sept. 14, 1954

2,689,306

UNITED STATES PATENT OFFICE 2,689,306

DEVICE FOR HOLDING SELF-DEVELOPING PHOTOGRAPHIC FILM AND APPARATUS FOR PROCESSING SAID FILM

Edwin H. Land, Cambridge, Mass., assignor to Polaroid Corporation, Cambridge, Mass., a corporation of Delaware Application March 6, 1951, Serial No. 214,155

21 Claims. (Cl. 250—68)

This invention relates to photography and is concerned with devices for holding a film unit of the self-developing type for exposure to actinic radiation, and is further concerned with apparatus useful in conjunction with a film holder of the invention for carrying out the processing of a film unit mounted within the holder.

Objects of the invention are to provide devices adapted to hold a self-developing film unit for storing and assisting in the processing of said film unit in lighted or illuminated surroundings, as well as for holding the film unit for exposure to light waves, X-rays, gamma rays and various other types of nuclear radiation and wherein the film holder makes use of a magazine within which said film unit is mounted for removal by exerting a pulling force on a portion of the film unit which extends from the magazine and wherein said magazine is substantially opaque to light waves actinic to a photosensitive portion of the film unit within the magazine and is transparent to X-rays, gamma rays and the like, with said magazine being provided with light-closure means, including light-seal means in lighttight and yielding contact with said film unit; particularly to provide film holders of the character described wherein the holder is provided with a dark chamber and a compartment which is open to actinic light and which provides means for protecting a portion of the film unit mounted within the film holder from physical damage; to provide a film holder of the character described especially suited for carrying out X-ray photography and having an intensifying screen mounted within the housing in spaced relation between the front and back surfaces of the holder whereby to partition the holder into two superposed dark chambers which extend longitudinally of the holder, each for receiving one or more layers of an individual film unit mounted within the holder; and to provide a film holder having two longitudinally extending dark chambers separated by stress-applying means for effecting the processing of a self-developing film unit mounted within the holder as said unit is withdrawn from the holder.

Other objects of the invention are to provide the combination of a film holder of the character described and a film unit which includes two overlying liquid-confining layers which are joined together and which are provided with leader means used for handling and processing said film unit; to provide film holders and film units which are usable with X-ray apparatus as well as camera apparatus; and to provide a film holder having a film unit mounted therein with a portion of the film unit extending therefrom and wherein the film holder is constructed for engagement with a processing apparatus capable of removing the film unit from said film holder and processing said film unit to effect the development thereof under lighted or illuminated conditions.

Further objects of the invention are to provide processing apparatus usable in conjunction with a film holder for withdrawing a film unit from the holder and processing said film unit; especially to provide apparatus of this nature which employs stress-applying members between which the layers of a self-developing film unit are manually or mechanically drawn to effect the rupture of a container carried by one of the layers of the film unit and holding a processing liquid; and to provide processing apparatus of the character described wherein the processing is automatically initiated upon engaging the film holder with the processing apparatus.

Other objects of the invention will in part be obvious and will in part appear hereinafter.

The invention accordingly comprises the products possessing the features, properties and the relation of components and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
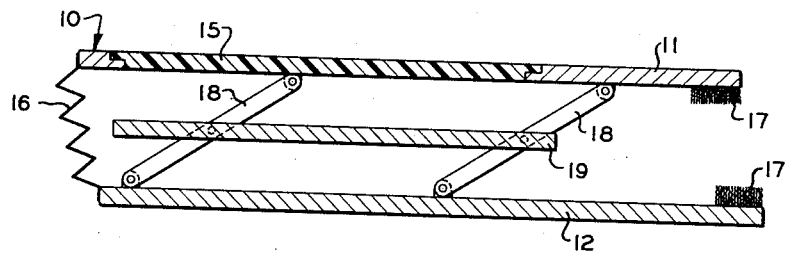
Figure 1 is a schematic side elevation, in section and with parts removed for simplicity, of one embodiment of a film holder especially suited for use in X-ray photography and shows the film holder in open condition for loading a film unit therein.
Figure 2:
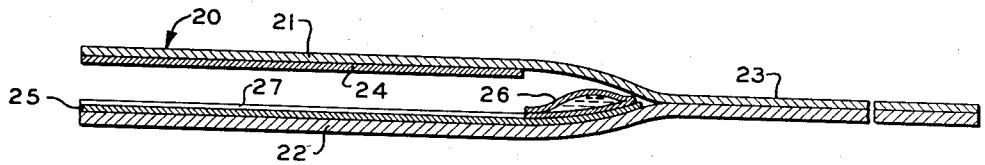
Fig. 2 is a diagrammatic side elevation, in section, of one embodiment of film unit usable with the various film holders of the invention.
Figure 3:
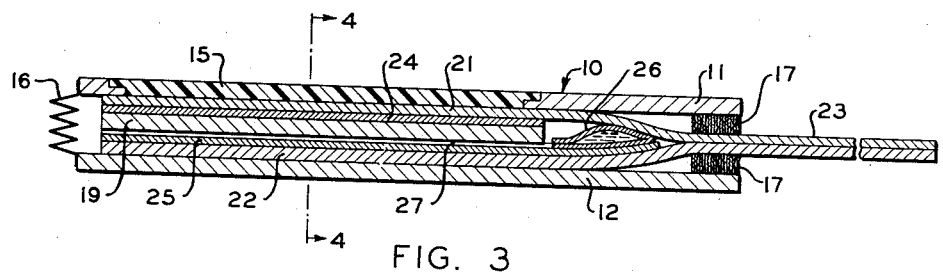
Fig. 3 is a sectional side elevation, similar to Fig. 1, showing the film unit of Fig. 2 mounted within the film holder and the film holder in closed and operating condition.

With reference to the drawings, wherein like parts are designated by similar reference numerals throughout the different views, there is shown in Figs. 1, 3, 4 and 5 one embodiment of a device 10 particularly suited for carrying out X-ray photography and usable for holding a self-developing film of the character shown in Fig. 2 and designated by the reference numeral 20. As disclosed in these figures of the drawings, the film holder 10 comprises a magazine having front, back and side portions 11, 12 and 14, respectively, and formed of materials which are substantially opaque to light waves but are transparent to X-rays, gamma rays and other forms of nuclear radiation. The front and back portions 11 and 12 of the magazine are in the form of rigid and generally flat wall members while the side portions 14 are constructed of suitable flexible material which is arranged in accordion folds to provide extensible side walls. Each side wall 14 is appropriately secured to the front and back wall members 11 and 12. The terms "front portion" and "front wall," and the like, are applied to the film holder to designate the portion thereof through which actinic radiation is adapted to enter the holder, and the terms "back portion" and "back wall," and the like, are applied to the part of said holder opposite to the "front portion" and furthest removed therefrom.

Since the film holder 10 is designed for the purpose of X-ray photography, front wall 11 is preferably formed of a substantially grainless material over the part thereof through which the X-ray exposure is made. As illustrated, front wall 11 is formed partly of a suitable metal and is provided with a plastic insert such as that indicated at 15. Organic plastics suitable for this purpose are well known to the art and among these a phenolic material is commonly employed. The insert 15 is of course opaque to actinic light waves.

Lighttight closure means are provided for closing off the ends of the film holder 10. In this regard, one end of the holder is closed by an opaque and extensible wall member 16 which is similar in construction to the side walls 14 and which is also suitably secured to the front and back walls 11 and 12. The other end of the holder 10 is adapted to be closed by suitable light-seal means 17 carried on the inner surface of each front and back wall 11 and 12 and comprising felt, bristles or other conventional light-seal materials. The light-seal means 17 is adapted to engage the outer surfaces of a film unit mounted within the film holder in lighttight and yielding contact.

By the use of extensible side and end walls 14 and 16, the front and back portions 11 and 12 of the film holder are movable toward and away from each other whereby to render the interior of the holder readily accessible for loading a film unit therein. Relative movement of the front and back walls 11 and 12 is facilitated by a parallel motion type of mounting means employing parallel links 18 positioned on the sides of the front and back wall members and pivotally connected thereto at their respective ends. Links 18, as shown, are covered by the extensible side walls 14.

X-ray film holders or cassettes preferably have an intensifying screen mounted therein and an intensifying screen 19, formed of conventional materials well known to the art, is employed with the film holder 10. This intensifying screen 19 is pivotally secured to the links 18 and is adapted to be arranged in parallel relation to the front and back walls 11 and 12. The links 18 and screen 19 are so designed and arranged that the screen is always spaced from the front and back walls 11 and 12 whereby a layer of a film unit 20 may be mounted on opposite sides of the screen. When the film holder is open, with links 18 at the top of their swing, the spacing between each wall 11 and 12 and the screen 19 is adequate to permit the ready loading of a film unit into the holder 10 with a layer thereof on each side of the screen.

Figure 4:
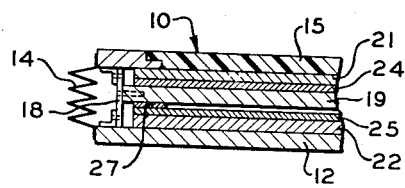
Fig. 4 is a sectional elevation on the line 4—4 of Fig. 3.
Figure 5:
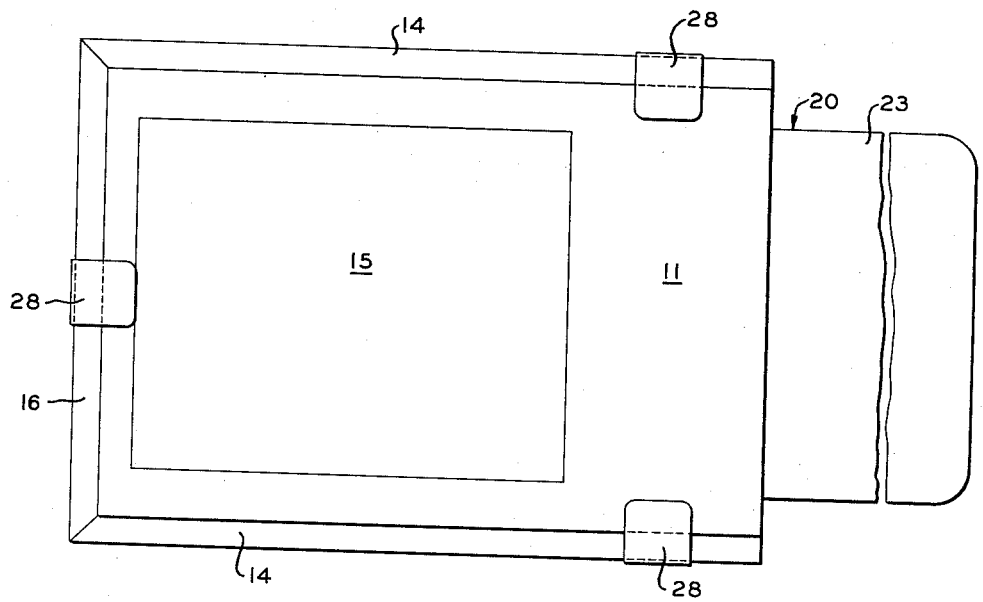
Fig. 5 is a diagrammatic plan view of the film holder illustrated in Figs. 1, 3 and 4 and shows the holder with a film unit loaded therein.

When the film holder 10 is in the closed condition of Fig. 4, the spacing between each wall 11 and 12 is so reduced that the layers of a film on opposite sides of screen 19 will be pressed into contact therewith.

Some detail of the film unit 20, which is usable with any of the film holders illustrated in the drawings, will here assist in a fuller understanding of the inventive concepts set forth herein. Film unit 20 comprises two liquid-confining layers 21 and 22 which are arranged in overlying registered relation and have a portion thereof suitably secured together and providing elongated leader means 23. The liquid-confining layer 21 includes a photosensitive area on a portion thereof in the form of a photosensitive element 24 comprising a silver halide emulsion, while the liquid-confining layer 22 includes an area over a portion thereof in the form of a print-carrying element 25, such as a sheet of image-receptive material, for example baryta paper. The photo-sensitive element 24 and the print-carrying element 25 provide respective inner surfaces of the liquid-confining layers.

A rupturable container 26 holding a liquid photographic processing composition is associated with either of the layers 21 or 22, for example the layer 22, and is mounted on the inner surface of the layer to extend transversely thereof for the discharge of its liquid content, upon rupture, between the liquid-confining layers 21 and 22. The container 26 is located adjacent the end of the photosensitive element 24 nearest the leader means 23 whereby its liquid content may be spread across the photosensitive area thereof and also over a corresponding area on the print-carrying element 25 which is in registration with the photosensitive area. Container 26 is formed of a substantially liquid- and oxygen-impervious material and has marginal portions of the walls thereof releasably sealed together. The liquid within the container preferably comprises a viscous solution of a thickening agent, a silver halide developer and a silver halide fixer.

Spacer strips 27, for example of suitable paper, are mounted along each long edge of the print-carrying element 25 and assist in controlling the spreading of the liquid composition and in confining the liquid to an area of the print-carrying element within said spacers 27.

In Fig. 2, the overlying liquid-confining layers 21 and 22 are shown as connected together only over a portion thereof whereby the photosensitive element 24 and the print-carrying element 25 are in effect hinged together with container 26 therebetween. If desired, other portions of the liquid-confining layers may be releasably secured together, although under these circumstances different layers of the film unit cannot be mounted on opposite sides of an intensifying screen.

The self-developing film unit of Fig. 2 is employed to carry out a photographic transfer process which, as it is now well understood to the art, is usable to provide in a print-carrying element, such as the element 25, a reverse image of a latent image contained in a layer of a photosensitive material such as the element 24. Transfer processing includes permeating a photographic developer and a silver halide fixer into the photosensitive element of the film unit and bringing the photosensitive element and print-carrying element into contact with each other.

This may be accomplished, in connection with the film unit 20, by applying sufficient pressure to opposite surfaces of the liquid-confining layers 21 and 22 to effect the rupture of container 26 and the spreading of its liquid content over elements 24 and 25 upon relative movement between the film unit and the pressure-applying means. The result of this processing is to develop latent image to silver and to form in the photosensitive element 24 a soluble silver complex from unexposed silver halide for transfer to the print-carrying element. This complex, at least in part, is transferred by imbibition to the print-carrying element where it is developed to silver to provide the desired reversed image. The liquid-confining layer with the photosensitive element 24 and the liquid-confining layer with the print-carrying element 25, after the completion of processing, are stripped apart.

In certain instances it is desirable to provide a developed and fixed negative image without forming a transfer or positive image. The film unit 20 is adapted for this practice by omission of the print-carrying element 25 and appropriate formulation of the processing liquid employed in the container 26.

Photosensitive units such as those illustrated herein make use of the principles of a transfer process. These principles, as well as specific film structures suitable for use in this invention, are set forth in my United States Patents Nos. 2,543,181, issued February 27, 1951, for Photographic Product, and 2,544,268, issued March 6, 1951, for Photographic Product, and also in my copending applications Serial Nos. 652,612, filed March 7, 1946 (now Patent No. 2,634,886); 728,983, filed February 17, 1947 (now Patent No. 2,603,565); 7,795, filed February 12, 1948 (now Patent No. 2,647,056); and 185,642, filed September 19, 1950 (now Patent No. 2,565,378), said Patents Nos. 2,544,268 and 2,565,378 being specific to film units especially adapted for X-ray photography. These various copending applications and said patents include detailed descriptions of film units comprising a photosensitive element and a print-carrying element which are adapted to contain all of the photographic materials needed to process the unit. Also, my said patents and copending applications are detailed as to containers for holding processing materials and further include descriptions of liquid processing compositions usable with film units including, in Patents Nos. 2,544,268 and 2,565,378, a liquid processing composition employable to develop a negative without forming a positive image. The practices, photographic materials and compositions described in said patents and applications are generally suitable for carrying out the present invention and special reference to the details thereof are made in the just-mentioned copending applications and patents.

The magazine of film holder 10 has an interior width between the links 18 on opposite sides thereof which is greater than the width of the film unit 20. Under these circumstances, and with regard to the just foregoing description of the film unit 20, it will be appreciated that the film unit may be readily loaded into a film holder 10, in the open position of Fig. 1, by inserting the film unit 20 therein so that the negative element 24 is located between the intensifying screen 19 and the front wall 11 and so that the positive element 25 is located between the intensifying screen and the back wall 12 and with the leader means 23 extending exteriorly of the light-seal means 17. The film unit 20 is loaded into the holder so that the photosensitive element 24 and the print-carrying element 25 thereof are suitably registered with the insert 15 through which the exposing radiation is directed. Front and back walls 11 and 12 of the holder are then moved relative to each other to bring the holder into the closed position illustrated in Figs. 3 and 4. The holder 10 is held in this closed position by suitably mounted fastening means, for example the spring clip means schematically indicated at 28 in Fig. 5. If desired, suitable means, such as finger grips, may be associated with the film holder 10 to facilitate opening and closing the same or spring means may be utilized to constantly urge the holder into the open position of Fig. 1.

Loading of the film unit into the film holder is carried out in a dark room, i. e., in the absence of actinic light. Once the film unit is mounted within the holder 10, as is also the case of the other film holders forming the subject of this invention, it may be handled in daylight. It will be appreciated that when the holder 10 is closed, two dark chambers are provided within the interior thereof, one on each side of the intensifying screen, and that these dark chambers extend longitudinally of the film holder. It will also be appreciated that the end wall 16 and the light-seal means 17 provide effective means for rendering the magazine of the holder inaccessible to the entry of actinic light when the holder is in closed position and has a film unit engaged therein.

The film holders of this invention, including the holder 10, in addition to providing means for storing the film and for holding the film for exposure, are also designed to assist in placing the film in a processing apparatus which is usable under lighted conditions. Hence, the film unit must be so held by the holder that it is withdrawable therefrom. For this reason the film unit is provided with an elongated leader such as the leader means 23. A portion of the leader means is adapted to extend beyond the end of the film holder so that it may be engaged by a processing apparatus without placing the film unit in a position wherein it will be struck by actinic light. Likewise, while the film unit is pressed into firm contact with the inner surfaces of the front and back wall members of the film holder and also with the intensifying screen 19, this contact is of such nature that the film unit may be withdrawn from the holder by the exertion of a pulling force upon the leader 23 without damage to the film unit.

In carrying out X-ray photography, it is preferable that the film unit 20 be positioned within the holder 10 so that the emulsion side of the film unit is between the intensifying screen and the front wall 11 of the film holder. This positioning is preferred as it prevents geometrical reversal of the transfer image when exposure is made through the front wall 11 of the film holder, i. e., through the back of the photosensitive emulsion. If geometrical reversal for the transfer image is unimportant, exposure of the photosensitive element 24 may be made through the front or emulsion side thereof. On the other hand, in X-ray photography, if a developed negative image is the end product desired, geometrical reversal of the negative image is prevented by exposure of the photosensitive element through the emulsion side.

Figure 6:
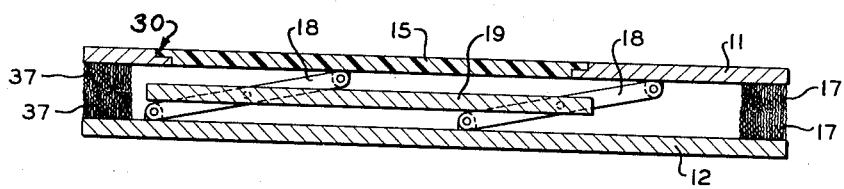
Fig. 6 is a diagrammatic side elevation in section, with parts removed, of another embodiment of film holder which is particularly suitable for carrying out X-ray photography and illustrates the film holder in closed condition but without a film unit therein.

Fig. 6 discloses a modified embodiment of a film holder, generally indicated by the reference numeral 30 and substantially similar in all respects to the film holder 10 with the exception that it is provided with light-seal means 17 and 37 at each end of the holder instead of an opaque extensible wall member 16 at one end and light-seal means 17 at the other end. While the film holder 10 is restricted to loading within a dark room, the construction shown for the film holder 30 permits daylight loading of a film unit, such as the film unit 20, when the film unit is mounted in a sealed envelope which is opaque to actinic light.

An envelope of this nature is of a length greater than the overall length of the film unit 20 so that when the envelope is mounted within the film holder 30, a portion of the envelope will extend from each end of the holder. Such an envelope may be opened by a severing string or cord located at the end of the envelope which encases the leader means 23 of the film unit and operable to cut the envelope walls at said end. This operation leaves the enevelope free to be pulled from the encased film unit upon inserting one hand within the cut end of the envelope and holding the leader means therewith while pulling on the portion of the envelope which extends beyond the light-seal means 37 of the film holder 30 with the other hand.

Figure 7:
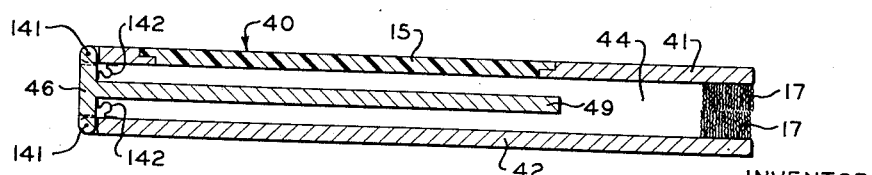
Fig. 7 is a diagrammatic side elevation in section of still another embodiment of film holder, also especially designed for X-ray work and also illustrates the film holder in closed condition but without a film unit therein.

Fig. 7 shows a further modification of a film holder generally indicated by the reference character 40 and differing primarily from the film holder 10 in that the magazine thereof is provided by a rigid end wall 46 from which rigid side walls 44 extend and by the use of a construction which hinges the front and back walls 41 and 42 to the end wall 46 by hinge means 141. As another difference, film holder 40 has the intensifying screen 49 fixed at one end to the end wall 46 by any conventional means. Light-seal means, such as cloth or felt strips 142, or the like, are secured to the end wall 46 and the front and back walls 41 and 42 adjacent each hinge.

Figure 9:
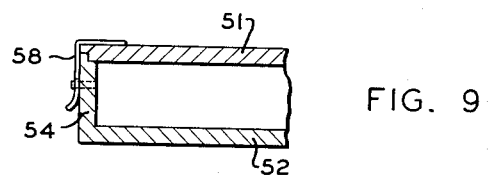
Fig. 9 is a sectional view taken on the line 9—9 of Fig. 8 and with parts thereof broken away.

Relative movement between the front and back walls 41 and 42 of the film holder 40 is provided by means of the hinge construction whereby the interior of the film holder may be opened for the loading of a film unit 20 in a manner similar to that described in connection with the film holder 10. Suitable retaining latch means, not shown in Fig. 7 but generally similar to those of Fig. 9, are provided on the holder 40 for the purpose of maintaining the holder in the closed condition illustrated in Fig. 7.

Figure 8:
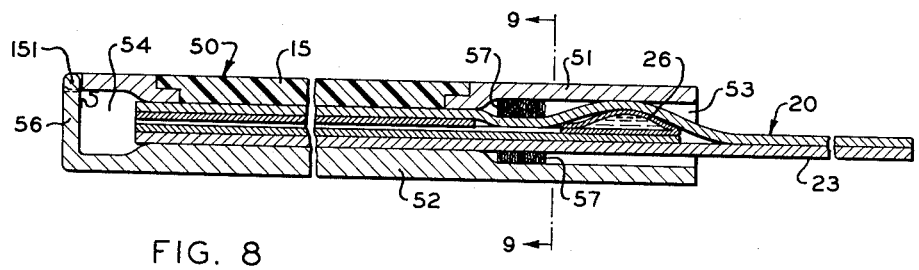
Fig. 8 is a diagrammatic side elevation in section of yet another type of film holder and shows the film holder in closed condition and with a film unit mounted therein, parts of said holder beng omitted for simplicity.

A still further embodiment of film holder is indicated at 50 in Fig. 8 and comprises a magazine type of structure having rigid back, side and end wall members 52, 54 and 56, respectively, which are secured together and which are formed of suitable material opaque to actinic light. The front wall 51 of the holder 50 is hinged as at 151 in a manner similar to the wall 41 of the film holder 40 whereby the film holder may be opened for the insertion of a film unit 20 therein. Also the front wall 51 of the film holder 50 is provided with the usual insert 15 through which exposure is adapted to be made. While not shown, an intensifying screen may be mounted within the holder, as for example by the construction illustrated in Fig. 7. It will, however, be understood that while use of an intensifying screen is desirable, the employment of a screen is not essentially necessary to carry out X-ray photography. In fact, the photosensitive element of the film unit employed with a device of the character of the film holder 50 may be provided with an intensifying screen by coating a suitable fluorescent material on the surface of the photosensitive element or by providing a fluorescent layer between the photosensitive element and the print-carrying element with which it is associated.

As may be observed, the interior of the walls 51 and 52 of the film holder 50 are flared away from each other at a position somewhat removed from the open end of the holder, i. e., the end removed from the end wall 56. This expedient provides the holder when in the closed position of Fig. 8 with a film magazine having an open compartment 53 which joins a chamber of smaller cross-sectional area located adjacent the exposure insert 15. The compartment 53 of enlarged cross-section is adapted to encase a portion of the film unit 20 which includes the container 26 thereof whereby the container is protected from physical injury which might cause premature rupture thereof. Leader portion 23 will of course extend beyond the open end of the holder 50.

Light-seal means 57, similar to the light-seal means 17, are mounted within the holder 50 at a position within the compartment 53 adjacent the chamber within which the photosensitive element and print-receiving element of the film unit are adapted to be located whereby to render light-tight that portion of the holder adapted to have the photosensitive material mounted therein. Latch or fastening means 58, comprising a spring member fixed to the front wall 51 adjacent an edge thereof and engageable with a pin carried by a side wall 54, are employed on opposite sides of the film holder 50 for securing the holder in its closed position illustrated in Fig. 8.

The film holder 50 is loaded with a film unit 20 and is operated in a manner similar to that already described. If desired, the end wall 56 has an opening formed therein which is provided with light-seal means whereby to permit daylight loading of the holder with a film unit contained in an opaque envelope.

Figure 10:
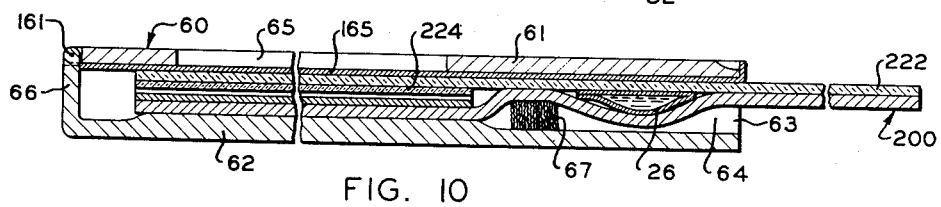
Fig. 10 is a diagrammatic side elevation in section of a further type of film holder which is generally similar to the film holder of Fig. 8 but is modified to adapt it for use with camera apparatus, and illustrates the film holder in closed condition and with a film unit mounted therein.

The film holder 50 of Fig. 8 is adapted for modification to permit its use with camera apparatus and in this modified embodiment is generally designated by the reference numeral 60 in Fig. 10. The back, side and end walls 62, 64 and 66 which form the magazine for the holder are constructed and arranged in a manner substantially similar to the walls 52, 54 and 56 of the holder 50. However, the front wall 61, instead of being provided with an insert of light-opaque material, is formed with a window 65 adapted to be covered with a slide 165 of a material which is opaque to actinic light. In this embodiment, the inner surface of the front wall 61 is not provided with a flared portion but the wall has a substantially flat inner surface and is of substantially uniform thickness throughout its length. This expedient permits the slide 165 to be suitably secured to said inner surface by conventional means for sliding movement into the position shown in Fig. 10 to close the window 65 and into a position to clear said window.

Slide 165 may be provided with a suitable turned-up projection which is used to facilitate actuation of the slide into operative and inoperative positions and which is adapted to be in contact with the front wall 61 at the open end thereof when the slide is in position to close the window 65. A suitably notched portion in the outer surface of the front member 61 provides means to permit manual engagement of the slide when in its closed position. Film holder 60 is adapted to be removably mounted, by well known means, on the back of a conventional plate or film pack camera.

Like front wall 51, wall 61 is hingedly secured to the end wall 66 of the film holder by hinge means 161. Slide 165 is employable to provide a light seal at the hinged joint.

It will be appreciated that the holder of Fig. 10, by retaining the construction for the back wall 62 similar to that of the back wall 52, is provided with a compartment 63 of enlarged cross section wherein the container portion of a film unit will be protected. In holder 60, however, compartment 63 is somewhat smaller than the enlarged compartment of Fig. 5 and light-seal means are provided only on the inner surface of the back wall 62 adjacent the chamber wherein the photosensitive portion of the film unit is located.

A film unit 200, similar to the film unit 20, is shown mounted within the holder 60. Film unit 200 differs from the film unit 20 by utilizing a liquid-confining layer 222 and a print-carrying element 224 which are formed of transparent materials. Furthermore, the film unit 200 is mounted in the holder 60 so that the print-carrying element is next to the front wall 61 whereby the photosensitive element of the film unit will be exposed from the front or emulsion side thereof. This expedient is preferred to prevent geometrical reversal of the transfer image formed upon exposure and processing of the film unit 200.

The film holder 60 is loaded and operated in a manner like that already described in connection with the other film holders set forth herein. If desired, the end wall 66 of the film holder 60 may be provided with a suitable opening, adapted to be closed by light-seal means, to permit daylight loading of a film unit contained in an envelope opaque to actinic light.

The inventive concepts set forth herein include the provision of apparatus for processing a film unit held in any one of the holders heretofore disclosed. Such apparatus generally comprises a boxlike receptacle having walls which are opaque to actinic light and is provided at one end with a mouth within which the open end of any of the film holders 10, 30, 40, 50 or 60 is adapted to be inserted and releasably engaged in lighttight bearing therewith. The leader 23 of the film unit has a length which perimts it to protrude from its film holder by a distance sufficient to allow at least an end portion of the leader to extend into the processing apparatus when the film holder is engaged with said apparatus. Pressure- or stress-applying means adapted to engage opposite surfaces of the film unit are mounted within the processing apparatus in alignment with the open mouth of the receptacle. The film unit is inserted between these pressure-applying means and is adapted to be moved therethrough.

With regard to the pressure-applying means, a variety of devices may be employed for this purpose, certain of which have been shown in the drawings for the purpose of illustration. For example, pressure-applying members may be employed which comprise a pair of non-rotatable bars, or a pair of plates, or the combination of a plate and a bar, or a pair of jaw-shaped members, or a plate and a roller, or a pair of pressure or pinch rolls.

The processing apparatus is constructed so that the pulling force needed to process a film unit may be exerted manually or by mechanical means so as to draw the film unit entirely through the pressure-applying means which effect the rupture of the container and the spreading of its liquid content. The receptacle is so designed that a dark chamber is provided for receiving the processed film after it has been passed through the pressure-applying means whereby to permit development of the film unit to be completed. A suitable lighttight closure is provided in the receptacle whereby the processed film may be removed from the apparatus after image formation. Processing apparatus of this character is disclosed in Figs. 11 through 19.

Figure 11:
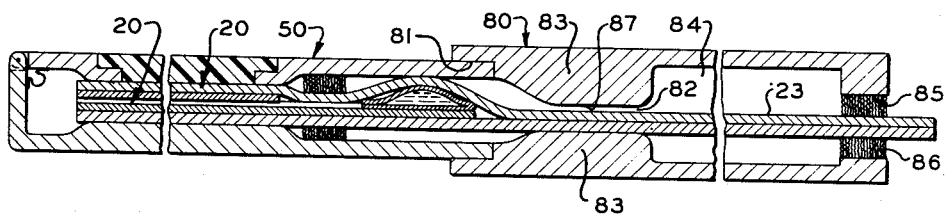
Fig. 11 is a diagrammatic side elevation, in section, showing the film holder of Fig. 8 engaged with a processing apparatus and shows a film unit carried by the film holder in a condition for processing.

Fig. 11 discloses one embodiment of a portable processing apparatus 80 provided at one end with an open mouth portion 81 which communicates through a restricted pasageway 82, formed between rigid members 83 extending from the top and bottom walls of the apparatus, with a chamber 84 having a film exit slot 85 located at the end thereof most distant from the mouth 81 and provided with a lighttight closure in the form of light-seal means 86. This construction provides processing apparatus in the form of a box-like receptacle. It is to be noted that the mouth 81, restricted passageway 82, chamber 84 and exit slot 85 are aligned with each other and provide a continuous passage through the apparatus having a width somewhat greater than the width of the film unit to be processed.

The mouth 81 is adapted to releasably engage the open end of a film holder and is provided with a suitable seat portion which permits the film holder to be correctly positioned with respect to the apparatus 80. The outer surfaces of the film holder are in lighttight bearing with the wall surfaces of the mouth 81. In general, the mouth 81 may be made sufficiently long so as to provide adequate support for a film holder engaged therein and the film holder may be retained in engaged position by frictional contact, or appropriate securing means may be employed to effect a positive connection between the processing apparatus and a film holder.

Rigid members 83 provide pressure- or stress-applying means between which a film unit is moved to effect the rupture of the container and the spreading of the liquid discharged therefrom between layers of the film unit. Members 83 may be an integral part of the top and bottom walls of the apparatus 80 or they may be individual elements which are secured to the walls. In any event, the rigid members 83 extend transversely of the apparatus 80 and substantially from side to side thereof and are so designed as to have substantially flat, straight portions 87 which are arranged in parallel relation to each other and which provide passageway 82 of a predetermined thickness or gap adapted to provide a pressure-generating throat for effecting the rupture of a container and the spreading of its liquid content. It will be noted that the members 83 are so shaped that the interior surfaces of the processing receptacle converge from the mouth 81 thereof towards the passageway 82 of predetermined thickness. This latter expedient facilitates entry of the container portion of a film unit into the pressure-applying or spreader means 83. Pressure-applying or spreader means of this character form the subject matter of United States Patent No. 2,483,014, issued to Edwin H. Land et al., on September 27, 1949, for Self-Developing Camera Apparatus, and need no further detailed disclosure.

Fig. 11 shows a film holder 50 containing a film unit 20 engaged with the processing apparatus 80. As may be noted, the construction of the apparatus 80 is such that when a film holder 50 is inserted into the mouth 81 of the apparatus, the leader 23 of the film unit will be inserted between the pressure-applying members 83 and the slot 85. Processing of the film unit proceeds by grasping the end of the leader 23 which extends through the light seal 86 and exerting a pulling force thereon. This procedure will draw the film unit 20 from the magazine and through the spreader or pressure-applying members 83 and at least until a portion of the film unit including the now ruptured container extends through the light-seal means 86 whereby the remainder of the film unit will be located within the chamber 84 which is of a length sufficient to receive at least that portion of the film unit 20 which includes the photosensitive and print-carrying elements thereof. Movement of the film unit 20 through the restricted passageway 82 provided by the pressure-applying means 83 effects the rupture of the container of the film unit and the spreading of its liquid content.

Inasmuch as the film unit 20, after processing, may become fogged if struck by actinic light, the chamber 84 is made lighttight and the film unit is allowed to remain therein until the image formation has been completed, generally for an imbibition period of about one minute. Following the completion of development, the leader is again grasped and the entire film unit is pulled from the apparatus 80 and the print-carrying element is stripped from the film assembly.

Processing apparatus 80 is of a portable character and during processing is adapted to be seated upon a suitable support surface and appropriately held thereon while pulling the film unit for processing purposes. Due to the fact that the boxlike receptacle providing the processing apparatus 80 is rendered substantially light-tight when a film holder is engaged therein, it is possible to carry out the processing of a film unit in lighted or illuminated surroundings and without resort to a darkroom.

Figure 12:
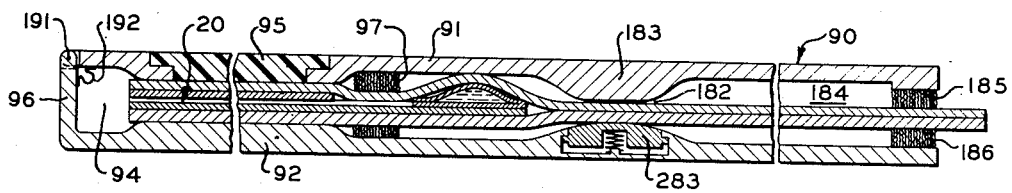
Fig. 12 is a diagrammatic side elevation, in section, of a combined film holder and processing apparatus and shows the various parts thereof in closed position and with a film unit mounted therebetween.

Fig. 12 ilustrates a combined film holder and processing device 90 having a film holder portion similar to the holder 50 and a receptacle portion for processing purposes similar to the apparatus 80. In this regard, the device 90 has a rigid end wall 96 from which the longitudinal rigid wall members 91, 92 and 94 extend. Wall member 91 is hinged at 191 to the end wall 96, the usual light-seal means 192 being provided adjacent the hinge connection between said walls.

The combined film holder and processing device is adapted to be provided with two chambers which are separated by a restricted passageway 182 provided by spreader means 183 and 283, generally similar to the fixed gap spreaders of the apparatus 80. The chamber between the end wall 96 of the device 90 and the spreader means provides a storage and exposure chamber and is adapted to hold the portion of the film unit 20 which includes the photosensitive and print-carrying elements and the container thereof. When the device 90 is intended for X-ray purposes, the portion thereof through which the actinic radiation is directed is provided with a plastic insert 95 of the character previously mentioned.

The other chamber 184 of the device 90 provides a processing or imbibition chamber within which the photosensitive and print-carrying portions of a film unit are held following the processing of the unit and is located on the other side of the spreader means 183, 283. An exit slot 185 through which the film unit may be withdrawn from the device is provided in the end of the device furthest from the end wall 96. Light-closure means 97 adapted to close the storage and exposure chamber are positioned within the device 90 between the end wall 96 and the restricted passageway 182, while light-seal means 186 adapted to close the imbibition chamber 184 are positioned at the exit slot 185. Appropriate securing means, such as those detailed in Fig. 9, are intended to be associated with the device 90 to maintain it in the closed position illustrated. While not shown, the device 90 may be provided with an intensifying screen in a manner similar to that shown in the film holder 40.

The pressure-applying means illustrated in connection with the device 90 are similar to the pressure-applying means of Fig. 11 with the exception that one of the pressure-applying and spreader members (283) is slidably mounted within a recess formed in the wall 92 for movement toward and away from its cooperating member 183. The member 283 is so mounted in its recess that its movement towards the member 183 is restricted. At the limit of its movement toward the member 183, the pressure-applying member 283 will be separated from the member 183 by a predetermined distance whereby to provide a restricted passageway between the members of minimum thickness. Spring means, of the character illustrated, are employed to constantly urge the member 283 into its position closest to the member 183.

This type of spring-loaded pressure-applying member is disclosed in previously mentioned United States Patent No. 2,483,014 and is employed to facilitate the movement of relatively thick objects through the spreader means. For example, it may be desirable to make the liquid-carrying container of a material thicker than that usually employed. A sufficient spring-loading of the pressure-applying member 283 is employed to permit the restricted passageway 182 to open to pass relatively incompressible objects but to remain fixed while rupturing the container and spreading its liquid content, i. e., the spring-loading is strong enough to resist the reaction force generated by the liquid when compressed by the pressure-applying means both in rupturing the container and in spreading the liquid between the layers of the film unit.

The combined film holder and processing device 90 is loaded with a film unit 20 in a manner similar to that described in connection with the loading of the film holder 50 and with the leader 23 of the film unit located to extend between the pressure-applying means 183 and 283 and through the exit slot 185. The manner of processing the film unit 20 within the device 90 will be apparent from the processing description given in connection with Fig. 11.

Figure 13:
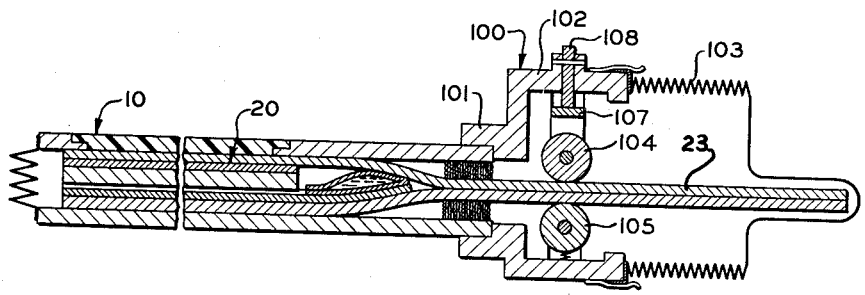
Fig. 13 is a diagrammatic side elevation, in section, showing a film holder of the type illustrated in Figs. 1, 3, 4 and 5 engaged within a portable processing apparatus.
Figure 14:
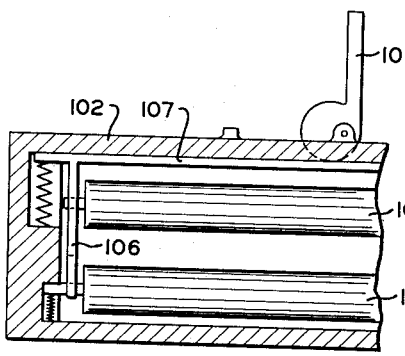
Fig. 14 is a schematic sectional elevation taken transversely of the processing apparatus shown in Fig. 13 and illustrates stress- or pressure-applying members of the apparatus in inoperative position.
Figure 15:
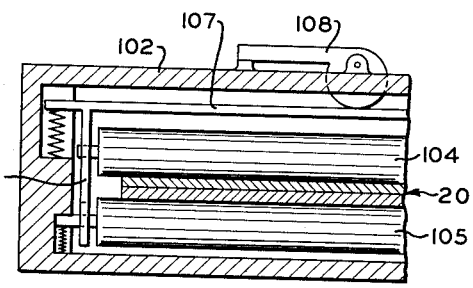
Fig. 15 is a sectional elevation similar to Fig. 14 and shows the stress- or pressure-applying members of the processing apparatus of Figs. 13 and 14 in operative position and with a portion of the film unit engaged therebetween.

Figs. 13, 14 and 15 show another embodiment of processing apparatus 100 suitable for use with the previously disclosed film holders. The apparatus 100 comprises a hollow head 102 adapted to support pressure-applying means and provided with a mouth portion 101 which is engageable in lighttight bearing with the end of a film holder. A bellows element 103, which is detachably secured to the end of the head most distant from the mouth portion 101, as for example by the spring clip means illustrated, completes a general description of the processing apparatus 100. Bellows element 103 is formed of a material which is substantially opaque to actinic light and, in combination with the hollow head, provides a receptacle within which the processed film unit is deposited during the imbibition period.

Pressure-applying means employed with the apparatus 100 makes use of upper and lower pressure-applying rolls 104 and 105 mounted by a construction wherein they are maintained at a fixed gap or separation during the processing of the film unit which is drawn therethrough. In this connection, the upper roll 104 has its ends journaled in spaced-apart arms 106 carried by a frame 107 which extends transversely of the head 102 and is mounted for movement toward and away from the top of the head. The frame 107 is spring-loaded and constantly urged toward the top of the head 102. Roll 105 is journaled in suitable bearing blocks which are slidably mounted for movement toward and away from the top of the processing head and are spring-urged into their uppermost position.

Means for moving the roll 104 toward the roll 105 and for maintaining it at a fixed position with respect to the roll 105 comprises a cam member 108 pivotally mounted upon the outer surface of the processing head and extending through the top wall thereof so that the cam surface may be utilized to press the frame 107, and consequently the roll 104, toward the roll 105 and the bottom wall of the head. Suitable stop means are shown to limit the movement of the cam member 108 to a position wherein it is at its maximum throw. Appropriate light-seal means, not shown, are provided adjacent the cam member 108.

Fig. 14 illustrates the rolls in separated and inoperative position, while Fig. 15 shows the cam member 108 depressed and the rolls moved to their closest separation for engaging the outer surfaces of the film unit to carry out the processing thereof. It will be appreciated that when a relatively thick object is moved between the rolls 104 and 105, the spacing between the rolls will be increased to permit passage of the object in a manner similar to that described in connection with the spreading means of Fig. 12.

A film unit 20 having a film holder 10 is shown as engaged with the processing apparatus 100. Mounting of the film holder and its film unit is carried out by inserting the film holder into the mouth 101 of the processing head and the leader 23 of the film unit between the pressure rolls 104 and 105 when the pressure rolls are at their fullest separation or in the inoperative position shown in Fig. 14. Thereafter, the cam member 108 is moved toward the top surface of the head 102 whereby rolls 104 and 105 assume their processing position in engagement with the film unit. Assuming that the bellows element 103 is in its collapsed condition shown in Fig. 13, the leader 23 of the film unit is grasped through the bellows and a pulling force is exerted thereon whereby to withdraw the film unit 20 from the film holder 10 and move it between the processing rolls 104 and 105 while extending the bellows element 103. After a sufficient imbibition period, bellows element 103 is disengaged from the processing head and the processed film unit is removed from the bellows element.

As may be observed, the processing apparatus 100 features an extremely portable design. Due to this portability, the apparatus 100 is particularly useful with the camera type of film holder 60 shown in Fig. 10. In this regard the apparatus 100, together with a supply of film holders 60, may readily be carried on field trips for producing a series of quickly completed prints of a scene or view as aids for determining the camera settings needed for high quality photographic portrayal thereof.

Figure 16:
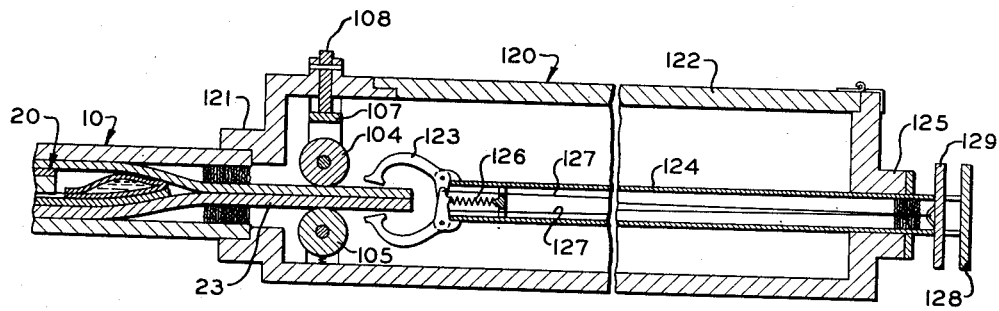
Fig. 16 is a diagrammatic side elevation, in section, of still another type of processing apparatus and schematically illustrates a film holder engaged with the processing apparatus for the processing of a film unit.
Figure 17:
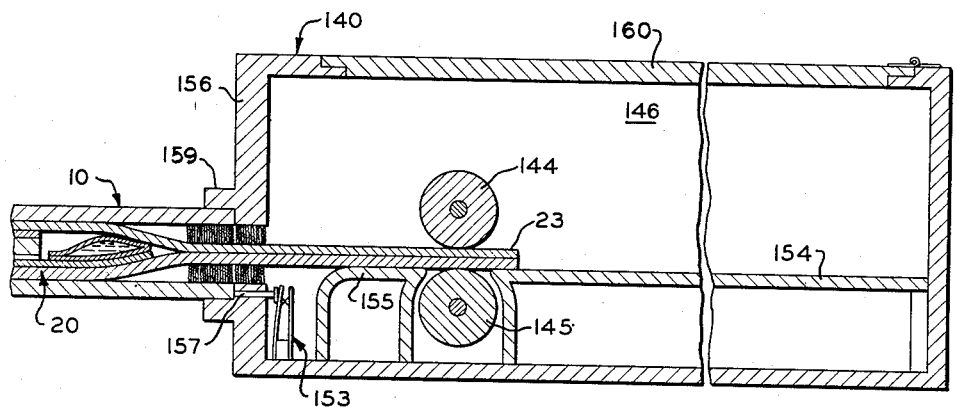
Fig. 17 is a diagrammatic side elevation, in section, of a further embodiment of a processing apparatus characterized by being automatically actuated upon positioning a film unit and its holder in processing alignment therewith.
Figure 18:
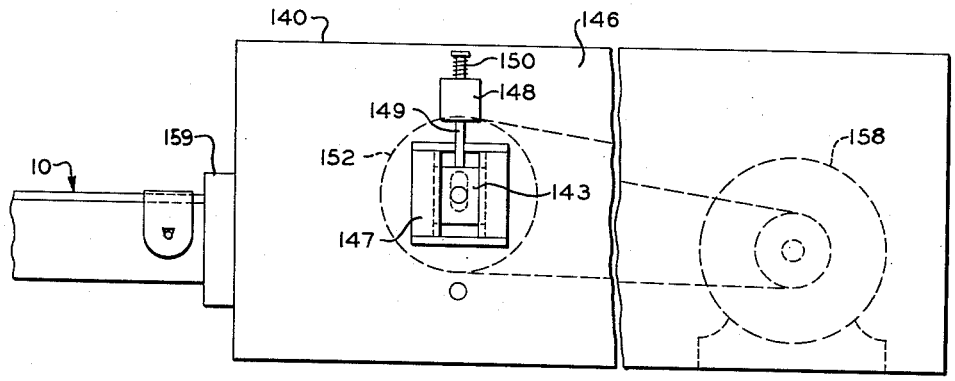
Fig. 18 is a diagrammatic side elevation, with parts removed, of the processing apparatus, film holder, and film unit of Fig. 17 and illustrates certain details of the mechanism for withdrawing a film unit from the film holder and carrying out the processing thereof.

A still further embodiment of the processing apparatus is indicated at 120 in Fig. 16 and comprises an elongated box structure having a mouth portion 121 at one end for receiving a film holder such as the film holder 10 shown as engaged therein. The receptacle walls of the apparatus 120 are substantially opaque to light and the upper wall is provided with a lighttight closure in the form of a door 122 whereby to gain access to the box. Also mounted in the box are pressure-applying rolls 104 and 105 mounted in alignment with the mouth portion 121 and which are actuated by a cam member 108, all similar to the arrangement described in connection with the processing apparatus 100 of Fig. 13.

Means for drawing the film unit 10 through pressure rolls 104 and 105 comprise grip members 123 in the form of tongs fixed to one end of a tubular slide member 124 slidably mounted in and extending through an opening in the processing receptacle comprising an elongated hollow bearing support 125 located in the end of the apparatus which provides the imbibition chamber. Preferably, the tubular slide 124 has a square cross-section whereby it may be more effectively held by the bearing surfaces of the support 125 when fully inserted within the processing receptacle, as shown in Fig. 16, or when at its extreme position of withdrawal therefrom.

Grip members 123 are secured to the inner end of the tubular slide member 124 and are pivotally mounted for movement toward and away from each other whereby they may be engaged with and disengaged from the opposite surfaces of a leader of a film unit. A conventional linkage connection between the grip members 123 is spring-loaded by spring 126 carried within the tubular slide to urge the grip members into separated and inoperative condition.

The tubular slide 124 has a handle member 128 fixed to its outer end and is provided with slots which extend from the handle 128 toward the grip members 123 for a short distance to permit a second handle member 129 to be slidably engaged and supported by the tubular slide member 124 and to have a portion thereof located within the bore of the slide. Each grip member 123 is connected by an individual cable 127 which extends through the tubular slide member 124 to a portion of handle member 129 located within the bore of the tubular slide member whereby the grip members 123 move toward each other upon pressing the handles 129 and 128 together. Spring 126 also holds handles 128 and 129 in separated and inoperative position. Light-seal means at the outer end of the bearing support 125 in surrounding relation to the tubular slide member 124 and light-seal means mounted within the slide are employed to prevent the entry of light into the processing chamber through these elements of the apparatus.

The manner of processing a film unit 20 which has the leader 23 thereof engaged between the pressure rolls 104 and 105 will now become apparent. Processing is carried out by grasping the handle members 128 and 129 and squeezing them together while exerting a pulling force thereon. The effect of this procedure is to engage the grip members 123 with the opposite surfaces of the leader 23 and to pull the film unit from its holder 10, through the pressure rolls 104 and 105 and into the imbibition chamber provided in the apparatus 120, while also pulling the tubular slide member 124 to its extreme extension from the box of the apparatus 120. Releasing the grip on the handle members 128 and 129 restores the grip members 123 to inoperative position and deposits the film unit on the bottom of the apparatus. After a suitable imbibition period, the door 122 is opened and the film removed. Apparatus 120 is then returned to the position shown in Fig. 16 by pushing inwardly upon the slide member 124 from the handle end thereof.

Apparatus 120 is portable and when in use is seated upon a support surface and may be maintained thereon during operation by contact of the end of the apparatus which supports the slide member with stop means slightly raised above the support surface.

As heretofore mentioned, a concept of the invention resides in the provision of processing apparatus wherein the processing is automatically initiated upon engaging a film holder with the apparatus. One means for carrying this concept into effect is illustrated by the apparatus 140 of Figs. 17, 18 and 19.

The apparatus 140 makes use of a boxlike receptacle similar to that employed by the apparatus 120 and has a lighttight door 160 adapted to provide access to the apparatus to remove a processed film unit therefrom. Likewise, the apparatus 140 is provided at one end with a receiving mouth 159 in which a film holder, such as a film holder 10, having a film unit 20 mounted therein, is engageable. Superposed pressure rolls 144 and 145 are shown as mounted within the interior of the apparatus 140.

The upper roll 144 of the roll pair is mounted for movement toward and away from the lower roll 145 whereby the rolls are separated by a distance sufficient to assure the ready insertion of a leader 23 of a film unit therebetween when the upper roll 144 is in inoperative position or at its furthest separation from the lower roll. By one construction, this is accomplished by a mounting for the upper roll 144 wherein the shaft thereof extends through the side walls 146 of the boxlike processing receptacle and is journaled for rotation in bearing blocks 143 slidable in guides 147 fixed to the outer surface of the side walls 146 (see Fig. 18). Walls 146 are provided with slots to permit vertical movement of the shaft of roll 144 and these slots may be individually covered with a lighttight gland or other light-seal means (not shown). The shaft of the lower roll 145 also extends through the side walls 146 and is rotatably supported in bushings in the side walls which are sufficiently lighttight so as not to require a special light seal.

Movement of the roll 144 toward and away from roll 145 is effected by a pair of straight-line solenoids 148, one of which is mounted on each side wall 146 and has its core 149 connected to a bearing block 143. Energization of solenoids 148 will cause the cores 149 thereof to move the roll 144 toward roll 145. Solenoids 148 are designed so that the cores 149 will move the roll 144 towards the lower roll 145 by a predetermined distance whereby the rolls will be maintained at a predetermined separation. The core member 149 of each solenoid is spring-loaded by a spring 150 whereby to return the core to inoperative position upon deenergization of the solenoid and this return is utilized to separate the pressure rolls and move the upper roll 144 into its inoperative position.

Figure 19:
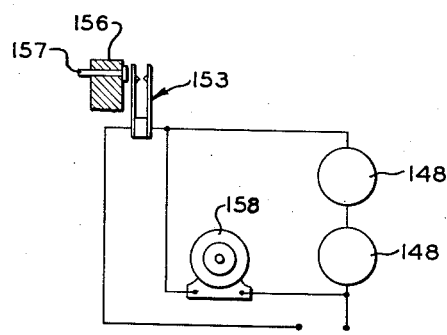
Fig. 19 is a schematic view of an electric circuit used in conjunction with the processing apparatus of Fig. 17.

It will be apparent that rotation of the rolls 144 and 145 when in pressure contact with a film unit may be utilized to draw the film unit from its holder and to move it between the rolls for processing. Means for rotating the rolls comprises an electric motor 158 suitably mounted outside of the processing receptacle and belted to a driven pulley 152 fixed on the outer end of one of the roll shafts, for example the shaft of the upper roll 144 (see Fig. 18). Motor 158 and solenoids 148 are connected in a simple circuit, as shown in Fig. 19, which is closed by normally open switch means 153 and which is supplied with current from a suitable source, for example a 110-volt alternating current source.

In types of processing apparatus where the film unit is pulled through the pressure means from the leader end, it is supported during processing and has little opportunity to become damaged. To duplicate these conditions in the apparatus 140, use is made of a platform 154 (Fig. 17) having a generally flat surface which supports the film unit as it is discharged from the rolls 144 and 145 during processing. A similar support platform 155 is desirable on the input side of the pressure rolls to facilitate the insertion of the film unit leader 23 between the rolls and also since the mechanical construction of the roll mounting in the apparatus 140 requires that the rolls be spaced at some distance from the mouth portion 159 of the apparatus. It is to be observed that the surfaces of the platforms 154 and 155 lie in a plane which is parallel to the top and bottom of the processing receptacle and which passes through the center of the mouth portion 159 of the apparatus and that this plane is tangent to the bottom roll 145.

Actuation of the apparatus 140 is made automatic by locating switch means 153 adjacent the wall 156 provided with the mouth portion 159 and slidably mounting a pin 157 within an opening which extends through the seat for the film holder. When the film holder is engaged within the mouth 159, it pushes pin 157 inwardly to close the switch means. One blade of switch means 153 is of a resilient nature and is constantly urged away from the other blade. Removal of the film holder after processing will allow the resilient switch blade to open the switch means and at the same time to force the pin 157 outwardly to a position to initiate another processing cycle.

Operation of apparatus 140 will now be apparent. When a loaded film holder is inserted within the mouth 159, the film unit leader 23 is guided between the rolls 144 and 145, which are moved into pressure engagement with the film unit and are rotated upon the end of the film holder, moving pin 157 into position to close the switch means. This causes the film unit to be moved between the rolls 144 and 145 and discharged onto platform 154. After the proper imbibition time, the processed film unit is removed from the apparatus through the door 160. Disengagement of the film holder from the mouth 159 permits switch means 153 to open to arrest actuation of the motor 158 and restore the roll 144 to inoperative and raised position.

It is desirable to relieve the pressure on the opposite sides of a film unit being processed by the pressure-applying members between the end of the image area and the trailing end of the film unit, i. e., the end of the film unit which is last to pass through the pressure-applying means. With a pressure-applying roll pair having one roll mounted for movement toward and away from the other, this pressure relief may be effected by appropriately mounted and driven cam means having a cam surface which is adapted to be brought into contact with an edge of the film unit and the movably mounted pressure roll whereby to effect separation of the rolls as desired. Cam mechanism of this character is illustrated and described in United States Patent No. 2,516,398, issued July 25, 1950, to Edwin H. Land et al. for Photographic Apparatus for Exposing and Processing Photographic Film, and such mechanism is intended for use with this invention.

While the present invention has been described in connection with photography, including X-ray photography, it will be appreciated that the concepts set forth herein include other fields. For example, a loaded film holder provides an excellent means for indicating and/or measuring dosages of nuclear radiation, such as electromagnetic radiation having a wavelength shorter than the wavelength of radiation within the ultraviolet region of the spectrum and including besides X-rays, gamma rays and corpuscular radiation, such as alpha particles, beta particles, fission product particles, and the like. Inasmuch as the photosensitive materials employed are sensitive to nuclear radiation of the character described, and since such radiation will penetrate the film holder and effect exposure of the photosensitive material, the importance of this invention as applied to dosimetry will at once be understood. Furthermore, the processing apparatus as set forth herein provides quick and efficient means for processing a film unit to determine the radiation dosage to which it has been subjected from the density value of the transfer print resulting from the processing of the film unit.

Since certain changes may be made in the above product and apparatus without departing from the scope of the invention herein involved, it is intended that all matter contained in the above description or shown in the accompanying drawings shall be interpreted as illustrative and not in a limiting sense.

What is claimed is:

1. A photographic product comprising a film unit having a first liquid-confining layer including a photosensitive area, a second liquid-confining layer, said layers being positioned in superposed relation and secured together, a portion of said film unit providing leader means for handling said film unit, a rupturable container holding a liquid composition and located between said layers to extend transversely thereof and positioned for discharge of its liquid content for spreading in contact with said layers, including said photosensitive area, a magazine housing said first and second liquid-confining layers, said container and at least a part of said leader, said magazine having front, back and side portions which together provide a housing for removably holding said film unit and which are substantially opaque to light waves actinic to the photosensitive material of said film unit, and lighttight closure means, for closing said magazine to actinic light and including light-seal means, positioned within said magazine between the ends thereof for lighttight engagement with the outer surfaces of the film unit mounted therein, said light-seal means providing a compartment in said magazine which is open to actinic light and which extends from one end of the magazine to said light-seal means and also providing a dark chamber between the other end of said magazine and said light-seal means, a portion of said film unit including said photosensitive area being located within the dark chamber of said magazine and the portion of said film unit including said container being located within said compartment of said magazine whereby said container is protected from accidental rupture, said leader portion of said film unit extending through said light-seal means and beyond said magazine to provide means for gripping said film unit for withdrawal from said magazine.

2. A photographic product as defined in claim 1 wherein the front and back portions of said magazine are mounted for movement relative to each other to effect the separation thereof for loading a film unit within the magazine.

3. A photographic product as defined in claim 1 wherein said magazine has a front portion provided with a window therein positioned in registration with the photosensitive area of said film unit mounted within said magazine, and wherein a slide member, substantially opaque to actinic light, is slidably carried by said magazine adjacent said front portion for movement into a position to close said window and into a position to clear said window.

4. A product for carrying out X-ray photography comprising a film unit having a first liquid-confining layer including a photosensitive area, a second liquid-confining layer, said layers being positioned in superposed relation and secured together, a portion of said film unit providing leader means for handling said film unit, including the processing thereof, a rupturable container holding a liquid composition and located between said layers to extend transversely thereof and positioned for discharge of its liquid content for spreading in contact with said layers, including said photosensitive area, a magazine housing said first and second liquid-confining layers, said container and at least a part of said leader, said magazine having front, back and side portions which together provide a housing for removably holding said film unit and which are substantially opaque to light waves actinic to the photosensitive material of said film unit and which transmit X-rays, the front and back portions of said magazine being provided by front and back walls arranged in overlying relation to each other, and lighttight closure means, for closing said magazine and including light-seal means, located at one end of said magazine for lighttight engagement with the outer surfaces of the film unit mounted within said magazine, said magazine having an intensifying screen mounted therein and located between said front and back walls and in spaced relation to each front wall and to said back wall, a portion of said film unit, including said photosensitive area, being located within said magazine with said photosensitive area adjacent said intensifying screen and in overlying relation thereto, said leader means of said film unit extending through said light-seal means and beyond said magazine to provide means for gripping said film unit for withdrawal from said magazine.

5. A product for carrying out X-ray photography as defined in claim 4 wherein said second liquid-confining layer includes a print-carrying area for receiving by transfer a reverse print of a latent image formed in said photosensitive area of said first liquid-confining layer upon exposure thereof to X-rays and wherein said liquid-confining layer having said photosensitive area is positioned adjacent one side of said intensifying screen and said liquid-confining layer having said print-carrying area is positioned adjacent the other side of said intensifying screen.

6. A product for carrying out X-ray photography as defined in claim 4 wherein the front and back walls of said magazine are mounted for movement relative to each other for separating said walls for loading a film unit within the magazine.

7. A product for carrying out X-ray photography as defined in claim 4 wherein said second liquid-confining layer includes a print-carrying area for receiving by transfer a reverse print of a latent image formed in the photosensitive area of the first liquid-confining layer upon the exposure of said photosensitive area to X-rays and said first and second liquid-confining layers are positioned on opposite sides of said intensifying screen and wherein the front and back walls of said magazine are mounted for movement relative to each other to separate said walls for loading a film unit within the housing.

8. A product for carrying out X-ray photography comprising a film unit having a first liquid-confining layer including a photosensitive area, a second liquid-confining layer, said layers being positioned in superposed relation and secured together, a portion of said film unit providing leader means for handling and processing said film unit, a rupturable container holding a liquid composition and located between said layers to extend transversely thereof and positioned for discharge of its liquid content for spreading in contact with said layers, including said photosensitive area, a magazine housing said first and second liquid-confining layers, said container and at least a part of said leader means, said magazine having front, back and side portions which together provide a housing for removably holding said film unit and which are substantially opaque to light waves actinic to the photosensitive material of said film unit and which are capable of transmitting X-rays, the front and back portions of said magazine being provided respectively by individual rectangularly shaped and generally flat front and back walls adapted to overlie each other in spaced relation, parallel linkage means connecting overlying long edges of said front and back walls whereby said front and back walls are movable parallel to each other to vary the spacing therebetween, the side portions of said magazine comprising flexible and extensible members which provide interconnecting side walls between said rectangular front and back walls, lighttight closure means for closing said magazine and including at least light-seal means at one end of said magazine for lighttight engagement with the outer surfaces of the film unit mounted therein, and a rectangularly shaped intensifying screen located between said front and back walls and carried by said parallel linkage means for parallel movement relative to said wall members whereby the separation of said screen from said front wall and from said back wall is variable in accordance with the position of said front and back walls with respect to each other, a portion of said film unit, including said superposed liquid-confining layers, being located within said magazine with said liquid-confining layers positioned on opposite sides of said intensifying screen and respectively pressed into contact therewith by the front wall and the back wall when said walls are in their position closest to each other, said leader means of said film unit extending through said light-seal means and beyond said magazine to provide means for gripping said film unit for withdrawal from said magazine.

9. A photographic product which comprises a film unit having a first liquid-confining layer including a photosensitive area, a second liquid-confining layer, said layers being positioned in superposed relation and secured together adjacent one end thereof, a portion of said film unit providing leader means for handling and processing said unit, a rupturable container holding a liquid composition and located between said layers to extend transversely thereof and positioned for discharge of its liquid content for spreading in contact with said layers, including said photosensitive area, a magazine within which there is mounted said first and second liquid-confining layers, said container and at least a part of said leader means, said magazine having front, back and side portions which together provide a housing for removably holding said film unit and which are substantially opaque to light waves actinic to the photosensitive material of said film unit and which are capable of transmitting X-rays, the front and back portions of said magazine comprising spaced-apart front and back walls which are each provided with a thickened portion located between their respective ends and together providing a restricted passageway within said magazine and extending transversely thereof with a chamber on each side of said restricted passageway, each said chamber having the overlying inner surfaces of the front and back walls of said magazine spaced apart at a greater distance than the overlying surfaces which form said restricted passageway, one of said chambers providing an exposure chamber and having a portion of said film unit, including said photosensitive area and said container, mounted therein, the other chamber providing an imbibition chamber wherein chemical processing of said film unit is carried out and having the leader means of said film unit extending therethrough and beyond the end of said magazine to provide means for gripping said film unit to effect the withdrawal of the portion of the film unit, including said photosensitive area and container, into said imbibition chamber and also to effect the withdrawal of the film unit entirely from said magazine, and lighttight closure means for closing said magazine and including light-seal means at the end of the magazine adjacent said imbibition chamber and also including other light-seal means located within said exposure chamber, each said light-seal means contacting the outer surfaces of said film unit in lighttight engagement, said restricted passageway providing means in the form of a pressure-generating throat for effecting the rupture of said container and the spreading of its liquid content between said liquid-confining layers when said container and said overlying liquid-confining layers are pulled through said throat.

10. A photographic film magazine providing front, back and side portions which are substantially opaque to light waves and which together provide a housing for removably holding a self-developing film unit of the type having overlying liquid-confining layers joined together and having positioned therebetween a rupturable container holding a liquid composition for processing said film unit, said film unit including a photosensitive material carried on one of said layers to extend lengthwise thereof and said film unit also having a portion thereof which provides leader means for handling said film unit, and closure means for substantially closing said magazine to light actinic to said photosensitive material, said closure means including light-seal means adapted to be engaged in substantially lighttight and yielding contact with a film unit mounted within the magazine whereby said film unit is withdrawable from said magazine by pulling upon said leader means, said light-seal means being positioned within said magazine between the ends thereof whereby to provide a dark chamber which extends from one end of the magazine to said light-seal means which is of sufficient length to receive the photosensitive material portion of a film unit mounted within said magazine and said light-seal means also providing a compartment which is open to actinic light and which extends from the other end of said magazine to said light-seal means, said open compartment providing means for protectively encasing a portion of a film unit, including said container, mounted within said magazine.

11. A film magazine providing front, back and side portions which are substantially opaque to light waves and which together provide a housing for removably holding a self-developing film unit of the type having overlying liquid-confining layers joined together and having positioned therebetween a rupturable container holding a liquid composition for processing said film unit, said film unit including a photosensitive material carried on one of said layers to extend lengthwise thereof and said film unit also having a portion thereof which provides leader means for handling said film unit, closure means for substantially closing said magazine to light actinic to said photosensitive material, said closure means including light-seal means at least at one end of said magazine and adapted for substantially lighttight and yielding engagement with the outer surfaces of a film unit mounted within the magazine whereby said film unit is withdrawable from said magazine by pulling upon a portion of said leader means adapted to extend through said light-seal means, and an intensifying screen mounted within said magazine in spaced relation to the front portion and the back portion of the magazine whereby said magazine is partitioned into two individual chambers, each of which extends longitudinally of said magazine and each of which is of a length sufficient to receive a portion of said overlying layers of the film unit including the photosensitive material carried on said layer.

12. A photographic film magazine providing front, back and side portions which are substantially opaque to light waves and which together provide a housing for removably holding a self-developing film unit of the type having overlying liquid-confining layers joined together and having positioned therebetween a rupturable container holding a liquid composition for processing said film unit, including a photosensitive area on one of said layers, and also having a portion which provides elongated leader means for handling said film unit, the housing of said magazine being provided with two chambers therein and also with a restricted passageway located between said chambers and communicating therewith, each said chamber having a length at least sufficient to hold a portion of said film unit, including said container and said photosensitive area, said passageway forming means providing a pressure-generating throat for rupturing the container of a film unit mounted within the magazine and for spreading the liquid content of said container between said liquid-confining layers upon drawing said film unit, including said container, through said passageway, and substantially lighttight closure means, for closing said magazine to light actinic to said photosensitive material, including light-seal means positioned within said magazine on each side of said passageway and adapted for substantially lighttight and yielding engagement with the outer surfaces of a film unit mounted within said magazine whereby said film unit is withdrawable from said magazine by pulling upon the leader means thereof.

13. In a device for processing a film unit which is removably mounted within a magazine and which comprises overlying liquid-confining layers having a rupturable container holding a liquid composition located therebetween and which has a portion providing leader means extending from said magazine, a processing receptacle having walls which are substantially opaque to light waves, said receptacle being provided with an opening and lighttight closure means therefor, and means within said receptacle between which said film unit is adapted to be drawn for applying a sufficient mechanical stress to said container to cause the release of its liquid content by the application of pressure to the opposite sides of said film unit as said film unit, including said container and said overlying layers, is moved between said stress-applying means, said receptacle having means for supporting said magazine with respect to said stress-applying means for alignment of said film unit with the stress-applying means and in a relation thereto for receiving the end of said leader means and with at least the end of the magazine from which said leader means extends positioned within said receptacle and protected from actinic light, said leader means also providing means for withdrawing said film unit from said magazine and through said stress-applying means by exerting a pulling force upon said leader means.

14. A device for processing a film unit as defined in claim 13 wherein said processing receptacle is provided with an opening adapted to releasably engage the end of a film magazine in substantially lighttight contact and to support said magazine, and wherein said opening which is engageable with said magazine is in alignment with said stress-applying means.

15. A device for processing a film unit as defined in claim 13 wherein said receptacle is provided with a substantially lighttight chamber for receiving therein a film unit which has been drawn through said stress-applying means.

16. A device for processing a film unit as defined in claim 13 wherein said stress-applying means are two separated surfaces which are substantially maintained at a predetermined distance apart and which provide a pressure-generating throat for pressing together opposite sides of said film unit as the film unit is drawn therethrough.

17. A device for processing a film unit as defined in claim 13 wherein said stress-applying means are a pair of superposed pressure-applying rolls.

18. A device for processing a film unit as defined in claim 13 wherein said receptacle includes bellows means collapsible to a position adjacent said stress-applying means whereby to permit leader means extending between the stress-applying means to be manually grasped through said bellows means to draw a film unit through said stress-applying means upon the exertion of a pulling force upon said bellows means and the leader, said bellows means being extensible to provide a chamber for receiving a film unit upon exerting a pulling force thereon and being collapsed by a compressive force.

19. A device for processing a film unit as defined in claim 13 wherein said receptacle is provided with manually operated gripper means for engaging the leader meanas of a film unit which extend through said stress-applying means, said gripper means comprising an elongated support which extends through said receptacle and which is slidably mounted for movement toward and away from said stress-applying means, said support having an end within said receptacle and an end located exteriorly of said receptacle, grip members at the end of the support within the receptacle, and manually operated means on the end of the support outside of the receptacle and connected to said grip members for actuating said members to effect the engagement thereof with a leader portion.

20. A device for processing a film unit as defined in claim 13 wherein said stress-applying means comprises a pair of pressure-applying rolls, means for rotatably mounting said rolls in superposed relation to each other and for movement toward and away from each other, and means for urging said rolls toward each other and for separating said rolls.

21. A device for processing a film unit as defined in claim 13 comprising a pair of superposed and rotatably mounted pressure rolls providing said stress-applying means, at least one of said rolls being mounted for movement relative to the other roll and normally maintained at a separation sufficient to permit a film unit leader to be inserted therebetween, electrically operated means for moving said rolls relatively to each other and into pressure-applying engagement with a film unit and other electrically operated means for rotatively driving at least one of said rolls, and switch means in circuit with both said electrically operated means and actuated upon the insertion of a film magazine into said processing receptacle for closing said circuit and effecting the withdrawal of a film unit from said magazine.

References Cited in the file of this patent

UNITED STATES PATENTS

| Number | Name | Date |
|---|---|---|
| Re. 13,815 | Crompton | Oct. 27, 1914 |
| 1,564,269 | Peyser | Dec. 8, 1925 |
| 2,520,641 | Land | Aug. 29, 1950 |
| 2,565,377 | Land | Aug. 21, 1951 |
| 2,572,358 | Land | Oct. 23, 1951 |
| 2,600,064 | McCune, Jr. | June 10, 1952 |